(12) United States Patent
Malik et al.

(10) Patent No.: US 8,396,195 B2
(45) Date of Patent: *Mar. 12, 2013

(54) METHODS, SYSTEMS, AND PRODUCTS FOR DYNAMICALLY-CHANGING IVR ARCHITECTURES

(75) Inventors: Dale Malik, Atlanta, GA (US); Richard A. Anderson, Alpharetta, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 249 days.

This patent is subject to a terminal disclaimer.

(21) Appl. No.: 12/829,453

(22) Filed: Jul. 2, 2010

(65) Prior Publication Data

US 2010/0272246 A1 Oct. 28, 2010

Related U.S. Application Data

(63) Continuation of application No. 11/300,186, filed on Dec. 14, 2005, now Pat. No. 7,773,731.

(51) Int. Cl.
H04M 1/64 (2006.01)

(52) U.S. Cl. ............... 379/88.22; 379/88.05; 379/88.11; 379/88.12; 704/270; 705/14

(58) Field of Classification Search ............... 379/88.22, 379/88.05, 88.11, 88.12; 705/14; 704/270
See application file for complete search history.

(56) References Cited

U.S. PATENT DOCUMENTS

| | | | |
|---|---|---|---|
| 4,142,067 A | 2/1979 | Williamson | |
| 4,788,715 A | 11/1988 | Lee | |
| 5,309,505 A | 5/1994 | Szlam et al. | |
| 5,455,853 A | 10/1995 | Cebulka et al. | |
| 5,553,121 A | 9/1996 | Martin et al. | |
| 5,867,572 A | 2/1999 | MacDonald | |
| 5,872,834 A | 2/1999 | Teitelbaum | |
| 6,016,336 A | 1/2000 | Hanson | |
| 6,044,382 A | 3/2000 | Martino | |
| 6,064,730 A | 5/2000 | Ginsberg | |
| 6,104,790 A | 8/2000 | Narayanaswami | |
| 6,112,172 A | 8/2000 | True et al. | |
| 6,122,346 A | 9/2000 | Grossman | |
| 6,240,448 B1 | 5/2001 | Imielinski et al. | |
| 6,243,684 B1 | 6/2001 | Stuart et al. | |
| 6,370,238 B1 | 4/2002 | Sansone et al. | |
| 6,421,672 B1 | 7/2002 | McAllister et al. | |
| 6,456,619 B1 | 9/2002 | Sassin et al. | |
| 6,487,277 B2 | 11/2002 | Beyda et al. | |
| 6,510,434 B1 | 1/2003 | Anderson et al. | |
| 6,665,644 B1 | 12/2003 | Kanevsky et al. | |
| 6,690,776 B1 | 2/2004 | Raasch | |
| 6,714,643 B1 | 3/2004 | Gargeya | |
| 6,718,017 B1 | 4/2004 | Price et al. | |
| 6,738,473 B1 | 5/2004 | Burg | |
| 6,775,264 B1 | 8/2004 | Kurganov | |
| 6,798,877 B2 | 9/2004 | Johnson | |
| 6,801,620 B2 | 10/2004 | Smith | |
| 6,820,260 B1 | 11/2004 | Flockhart | |
| 6,842,767 B1 | 1/2005 | Partovi | |

(Continued)

FOREIGN PATENT DOCUMENTS

WO WO 2004/040889 5/2004

*Primary Examiner* — Gerald Gauthier
*Assistant Examiner* — Simon King
(74) *Attorney, Agent, or Firm* — Scott P. Zimmerman PLLC

(57) ABSTRACT

Methods, systems, and products are disclosed for dynamically changing an Interactive Voice Response (IVR) system. Responses to a menu of prompts are monitored. A presentation order of the menu of prompts is automatically updated according to a set of rules. The set of rules describe qualifications for dynamically changing the menu of prompts.

20 Claims, 18 Drawing Sheets

U.S. PATENT DOCUMENTS

| | | | |
|---|---|---|---|
| 6,853,966 | B2 | 2/2005 | Bushey |
| 6,885,733 | B2 | 4/2005 | Pearson et al. |
| 6,922,466 | B1 | 7/2005 | Peterson et al. |
| 6,944,592 | B1 | 9/2005 | Pickering |
| 6,965,664 | B1 | 11/2005 | McIntosh et al. |
| 7,023,837 | B1 | 4/2006 | Srinivasan |
| 7,043,435 | B2 | 5/2006 | Knott et al. |
| 7,050,990 | B1 | 5/2006 | Chu et al. |
| 7,065,188 | B1 * | 6/2006 | Mei et al. .................. 379/88.23 |
| 7,257,217 | B1 | 8/2007 | Lee |
| 7,295,668 | B2 | 11/2007 | Singer |
| 7,386,103 | B1 | 6/2008 | Chahal |
| 7,436,948 | B1 | 10/2008 | Thenthiruperai |
| 2001/0024497 | A1 | 9/2001 | Campbell |
| 2003/0005076 | A1 | 1/2003 | Koch et al. |
| 2003/0035531 | A1 | 2/2003 | Brown et al. |
| 2003/0041314 | A1 | 2/2003 | Heeren et al. |
| 2003/0061029 | A1 | 3/2003 | Shaket |
| 2003/0112952 | A1 | 6/2003 | Brown |
| 2003/0191648 | A1 | 10/2003 | Knott et al. |
| 2003/0195748 | A1 | 10/2003 | Schalkwyk |
| 2003/0232640 | A1 | 12/2003 | Walker |
| 2004/0006476 | A1 | 1/2004 | Chiu |
| 2004/0042592 | A1 | 3/2004 | Knott |
| 2004/0042593 | A1 | 3/2004 | Gulrajani et al. |
| 2004/0120479 | A1 | 6/2004 | Creamer et al. |
| 2004/0153322 | A1 | 8/2004 | Neuberger et al. |
| 2004/0205731 | A1 | 10/2004 | Junkermann |
| 2004/0215757 | A1 | 10/2004 | Butler |
| 2004/0267613 | A1 | 12/2004 | Chan et al. |
| 2005/0008141 | A1 | 1/2005 | Kortum |
| 2005/0027536 | A1 | 2/2005 | Matos |
| 2005/0060304 | A1 | 3/2005 | Parikh |
| 2005/0069122 | A1 | 3/2005 | Lin |
| 2005/0081152 | A1 | 4/2005 | Commarford et al. |
| 2005/0129252 | A1 | 6/2005 | Heintzman et al. |
| 2005/0135338 | A1 | 6/2005 | Chiu et al. |
| 2005/0137875 | A1 | 6/2005 | Kim et al. |
| 2005/0171779 | A1 | 8/2005 | Joublin |
| 2005/0234891 | A1 | 10/2005 | Walther et al. |
| 2005/0246174 | A1 * | 11/2005 | DeGolia ....................... 704/270 |
| 2005/0256866 | A1 | 11/2005 | Lu et al. |
| 2006/0165104 | A1 | 7/2006 | Kaye |
| 2006/0190825 | A1 | 8/2006 | Zaag |
| 2006/0294192 | A1 | 12/2006 | Mao et al. |
| 2007/0101394 | A1 | 5/2007 | Fu et al. |
| 2007/0116195 | A1 | 5/2007 | Thompson et al. |
| 2007/0204025 | A1 | 8/2007 | Cox et al. |

* cited by examiner

METHODS, SYSTEMS, AND PRODUCTS FOR DYNAMICALLY-CHANGING IVR ARCHITECTURES

CROSS-REFERENCE TO RELATED APPLICATIONS

This application is a continuation application of U.S. application Ser. No. 11/300,186, filed Dec. 14, 2005, now issued as U.S. Pat. No. 7,773,731, and incorporated herein by reference in its entirety.

BACKGROUND

This application generally relates to communications and, more particularly, to messaging and to message synthesis.

Prompting systems are very popular in today's communications environment. These prompting systems, such as an Interactive Voice Response (IVR) system, quickly direct a user to a particular department, extension, or information. These prompting systems, additionally, are an efficient and less expensive method of resolving customer inquiries. Although a minority of users lament the loss of human operators, most users are satisfied with the faster customer service offered by today's prompting systems.

While prompting systems are great for both businesses and users, prompting systems often become stale. That is, the menu of prompts becomes outdated or even wrong. Because business budgets are often tight, only rarely will the menu of prompts be analyzed and compared to current needs. The budget must also fund one or more software programmers to reconfigure the menu of prompts to reflect the update. (The user then often hears the standard message "Please pay careful attention—our menu items have changed.") Because most businesses, however, only rarely budget money to review and to modify the menu of prompts, the menu of prompts is often outdated. Menus may be so outdated that they sometimes result in a frustrating "dead end." What is needed, then, is a prompting system that automatically updates itself, reducing the need for human analysis and reconfiguration.

SUMMARY

The aforementioned problems, and other problems, are reduced, according to the exemplary embodiments, using methods, systems, and products that dynamically change a menu of prompts in a prompting system. The prompting system may be voice-based, such as an Interactive Voice Response (IVR) system. The prompting system, however, could also prompt a user with electronic messages. However the prompts are made, exemplary embodiments dynamically change the prompts whenever needed, with little or no human interaction. That is, exemplary embodiments describe a "self-learning" menu of prompts. The exemplary embodiments automatically reconfigure the menu of prompts according to a set of rules. This set of rules defines how the menu of prompts may be autonomously and dynamically changed. The set of rules, additionally, may also establish boundaries that limit or confine those dynamic changes. The prompting system then uses this set of rules when reconfiguring the menu of prompts.

The exemplary embodiments describe a method for dynamically changing an Interactive Voice Response (IVR) system. Responses to a menu of prompts are monitored. Responsive to the responses, a presentation order of the menu of prompts is automatically updated according to a set of rules. The set of rules describes qualifications for dynamically changing the menu of prompts based on the responses.

In another of the embodiments, a system is disclosed for dynamically changing an Interactive Voice Response (IVR) system. An Interactive Voice Response (IVR) application is stored in memory and a processor communicates with the memory. The processor monitors responses to a menu of prompts in the IVR system. Responsive to the responses, the processor automatically updates a presentation order of the menu of according to a set of rules. The set of rules describes qualifications for dynamically changing the menu of prompts based on the responses.

In yet another embodiment, a computer program product is also disclosed for dynamically changing an Interactive Voice Response (IVR) system. The computer program product comprises a computer-readable medium storing computer code. This computer code monitors responses to a menu of prompts in the IVR system. Responsive to the responses, the computer code automatically updates a presentation order of the menu of prompts according to a set of rules. The set of rules describes qualifications for dynamically changing the menu of prompts based on the responses.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

According to exemplary embodiments, methods, systems, and products are disclosed that dynamically change a menu of prompts in a prompting system. The prompting system may be voice-based, such as an Interactive Voice Response (IVR) system. The prompting system, however, could also prompt a user with electronic messages. However the prompts are made, exemplary embodiments dynamically change the prompts whenever needed, with little or no human interaction. That is, exemplary embodiments describe a "self-learning" menu of prompts. The exemplary embodiments reconfigure the menu of prompts according to a set of rules. This set of rules defines how the menu of prompts may be autonomously and dynamically changed. The set of rules, additionally, may also establish boundaries that limit or confine those dynamic changes. The prompting system then uses this set of rules when reconfiguring the menu of prompts.

Figure 1:
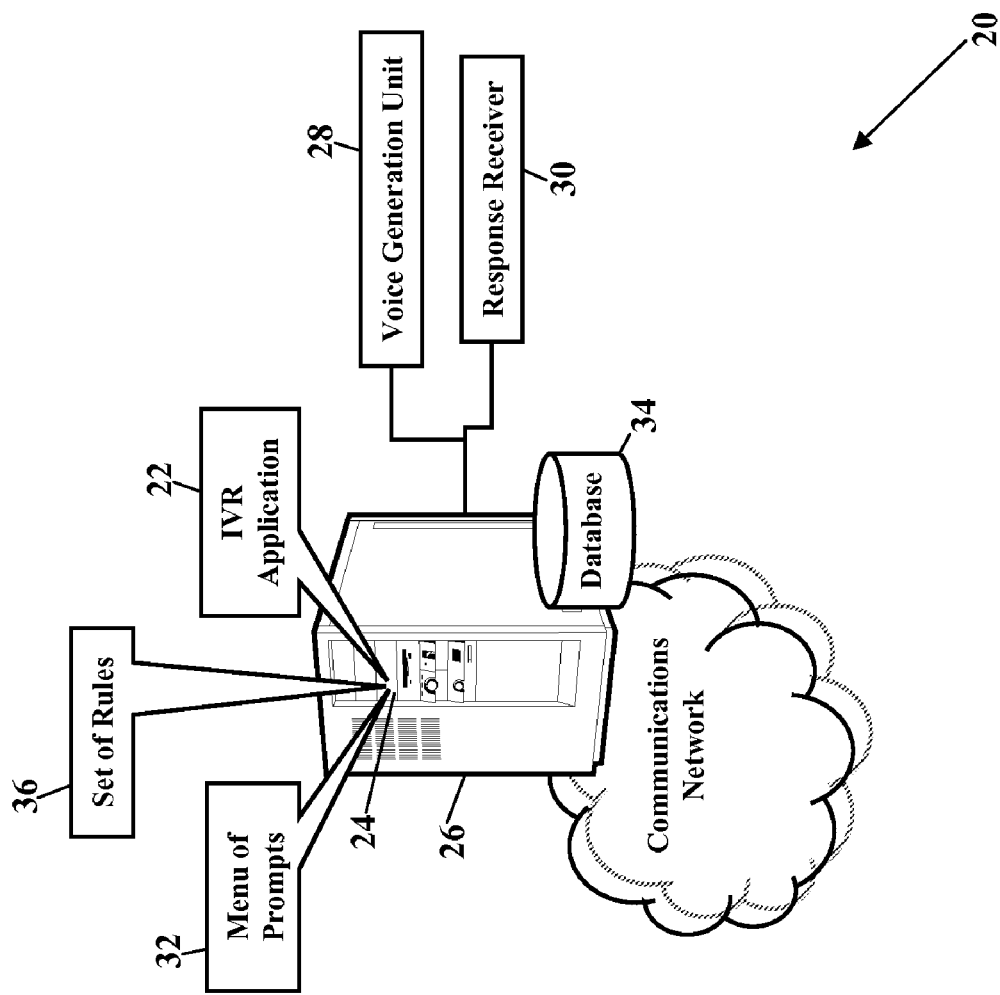
FIG. 1 is a schematic illustrating an Interactive Voice Response (IVR) system, according to exemplary embodiments.

FIG. 1 is a schematic illustrating an Interactive Voice Response (IVR) system 20, according to exemplary embodiments. The IVR system 20 comprises an Interactive Voice Response (IVR) application 22 stored in memory 24 of a computer 26. (Although the computer 26 is simply shown, FIG. 17 and its accompanying text provide a more detailed explanation of the computer 26.) The IVR system 20 may couple to a voice generation unit 28 and to a response receiver 30. The voice generation unit 28 generates voice messages, and the response receiver 30 receives responses to those voice messages. The responses may be Dual-Tone Model Frequency (DTMF) inputs, such that the response receiver 30 receives and transmits the DTMF inputs. The responses may be vocal or audible and analyzed and interpreted by voice recognition. The responses may be electronic messages received by the IVR application 22. The operating principles and componentry of a typical IVR system are well understood by those of ordinary skill in the art and thus will not be further explained here. If the reader desires a further explanation, the reader is directed to the following sources, all incorporated herein by reference: U.S. Pat. No. 6,016,336 to Hanson (Jan. 18, 2000); U.S. Pat. No. 6,370,238 to Sansone et al. (Apr. 9, 2002); U.S. Pat. No. 6,456,619 to Sassin et al. (Sep. 24, 2002); U.S. Pat. No. 6,487,277 to Beyda et al. (Nov. 26, 2002); U.S. Pat. No. 6,885,733 to Pearson et al. (Apr. 26, 2005); and U.S. Pat. No. 6,922,466 to Peterson et al. (Jul. 26, 2005).

The IVR system 20 differs from a conventional IVR system at least because it dynamically changes its menu. The IVR system 20 audibly and/or visually presents a menu 32 of prompts to users. The menu 32 of prompts is stored in the memory 24. As the users respond to the menu 32 of prompts, the responses are stored in a database 34. The database 34 may also store or maintain historical statistics describing the responses. The IVR system 20 uses the IVR application 22 to monitor and to analyze those responses to automatically and to dynamically change the menu 32 of prompts. According to exemplary embodiments, the menu 32 of prompts is dynamically changed to reflect the frequency or popularity of prompts. Those prompts that are frequently selected are promoted within the menu hierarchy. Those prompts that are less popular will be demoted. The hierarchical tree structure of the menu 32 of prompts dynamically changes based on users' responses. Rather than being a static structure, the menu 32 of prompts expands and contracts to reflect frequency of use. Because the hierarchical tree structure can self-adjust, customer service improves.

According to exemplary embodiments, the IVR system 20 dynamically changes according to a set 36 of rules. The set 36 of rules describes the qualifications for dynamically changing the menu 32 of prompts. The set 36 of rules is stored in the memory 24. Because the hierarchical tree structure can self-adjust, the set 36 of rules imposes restrictions on the configuration of the tree structure. The IVR application 22 uses the set 36 of rules to determine how a prompt qualifies for movement within the tree structure. The set 36 of rules also limits the hierarchical tree structure to defined boundaries. These boundaries ensure that the number of branches and/or tiers within the tree do not grow too large or too small. The IVR application 22 may also use the set 36 of rules to compare historical statistics stored in the database 34. The IVR application 22 may thus use historical statistics to additionally or alternatively determine changes in the presentation order of the menu 32 of prompts.

In the figures that are described below, as in FIG. 1, the reference numeral 20 is used to refer to an IVR system and the reference numeral 22 is used to the refer to an IVR application for ease of illustration. However, it should be appreciated that an IVR system 20 and the IVR application 22 need not include all the elements and capabilities described with reference to the figures below. Rather, the IVR system 20 and the IVR application 22, according to exemplary embodiments, may include one or any combination of elements and capabilities for dynamically ordering the menu 32 of prompts described with reference to the figures.

Figure 2:
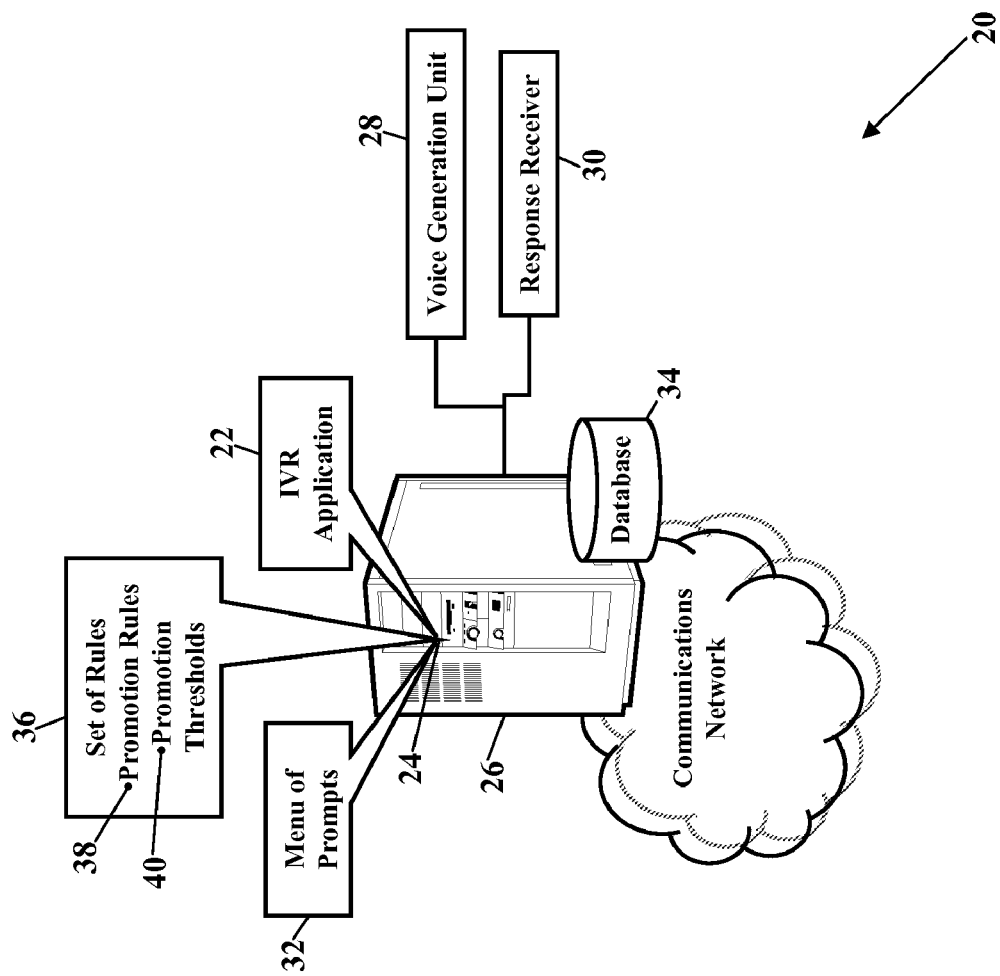
FIGS. 2 and 3 are schematics illustrating promotion rules, according to exemplary embodiments.
Figure 3:
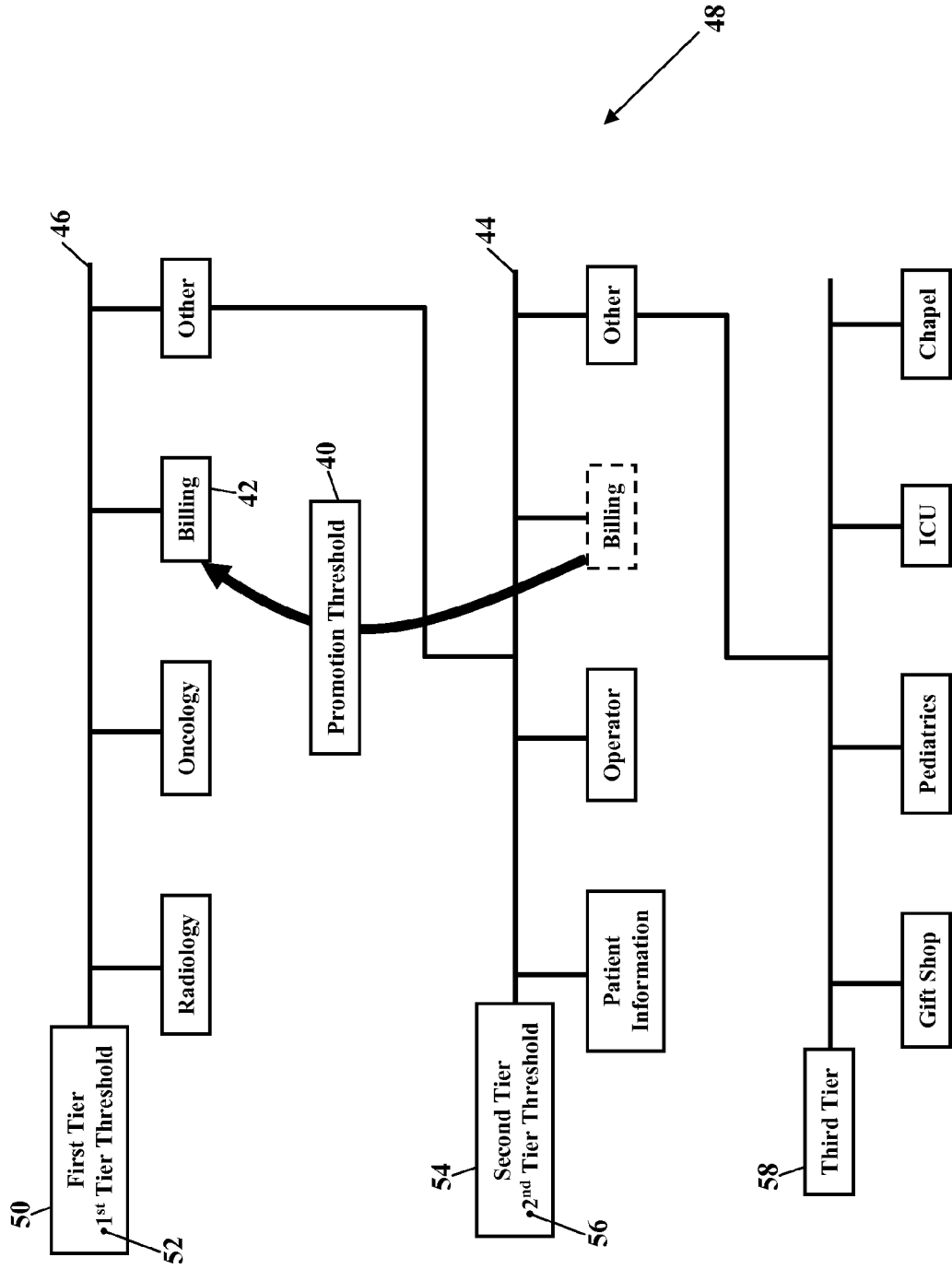

FIGS. 2 and 3 are schematics illustrating promotion rules, according to exemplary embodiments. Here the set 36 of rules includes one or more promotion rules 38. The promotion rules 38 describe the qualifications or requirements for promoting any prompt to a higher level or tier within the menu 32 of prompts. The promotion rules 38 may include one or more promotion thresholds 40. The promotion thresholds 40 represent a minimum number of selections or responses that are required for promotion between tiers. As FIG. 3 illustrates, a prompt 42 may be promoted from a lower level 44 to a higher level 46 within the hierarchical tree structure 48. When the cumulative number of responses to the prompt 40 equals or exceeds the promotion threshold 40, then the Interactive Voice Response (IVR) application 22 has authority to move or promote the prompt 40 to the higher level 46.

FIG. 3 also illustrates inter-tier thresholds within the hierarchical tree structure 48, according to an exemplary embodiment. FIG. 3 illustrates a hierarchical tree of prompts for a hospital or other medical facility. FIG. 3 illustrates three levels of prompts, with each hierarchical level having an associated threshold. A first tier 50, for example, may have a first tier threshold 52. The first tier 50 is reserved for only the most popular prompts. Suppose the first tier threshold 52 is thirty percent (30%). Thus, any prompts receiving at least 30% of the responses occupy the first tier 50. A second tier 54 has a second tier threshold 56. Perhaps this second tier threshold 56 is fifteen percent (15%), meaning any prompts receiving at least 15% of the responses occupy the second tier 54, that are not already promoted to the first tier. A lowest, third tier 58 would then be reserved for the least popular prompts. As FIG. 3 illustrates, when the number of responses for the "Billing" prompt 42 exceeds the promotion threshold 40, then the Interactive Voice Response (IVR) application 22 has authority to move or promote the "Billing" prompt 42 to the first tier 50. The remaining second tier prompts (such as "Patient Information" and "Operator") remain in the second tier 54 (unless, of course, they also satisfy the promotion threshold 40).

The promotion rules 38, then, determine when a prompt is promoted to a higher level within the hierarchical tree structure 48. As the Interactive Voice Response (IVR) application 22 monitors and analyzes the cumulative responses, the IVR application 22 determines the percentage of responses for any prompt. If any prompt's percentage satisfies a tier threshold, then that prompt may be promoted to a higher level or tier. As the following paragraphs explain, however, other rules may limit the ability of IVR application 22 to promote prompts.

Figure 4:
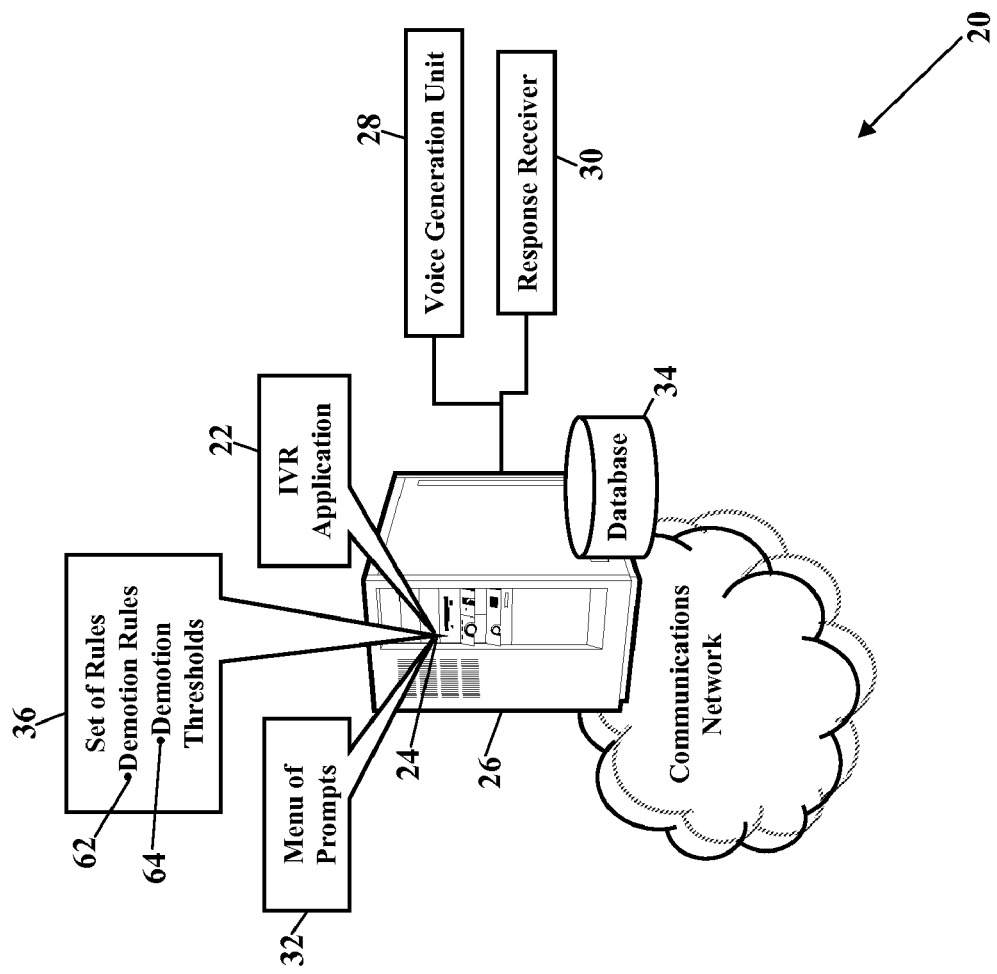
FIGS. 4 and 5 are schematics illustrating demotion rules, according to more exemplary embodiments.
Figure 5:
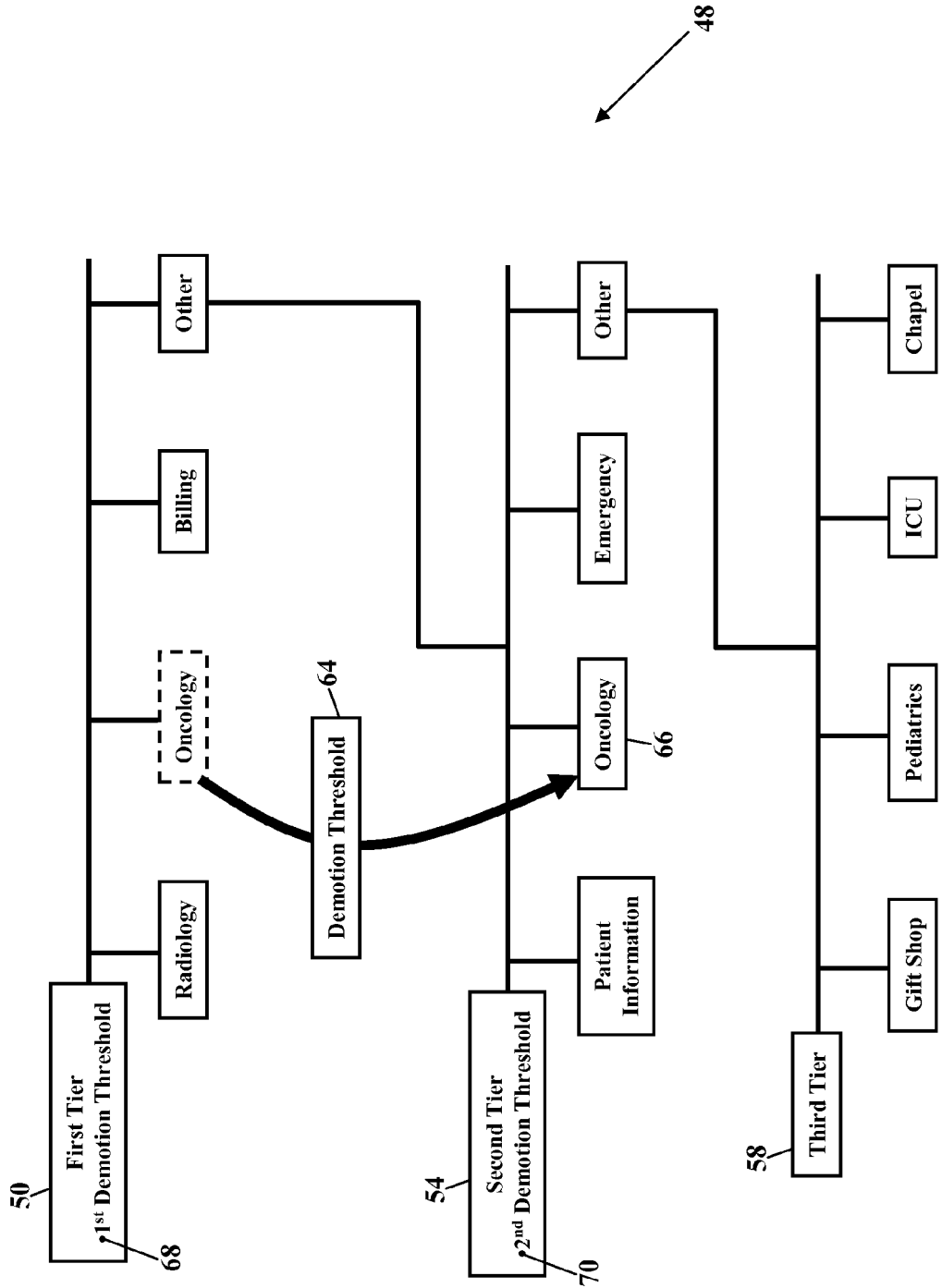

FIGS. 4 and 5 are schematics illustrating demotion rules, according to more exemplary embodiments. Here the set 36 of rules includes one or more demotion rules 62. The demotion rules 62 describe the qualifications or requirements for demoting a prompt down one or more hierarchical levels. The demotion rules 62 may include one or more demotion thresholds 64. The demotion thresholds 64 represent a minimum number of selections or responses that are required to occupy a tier. If a prompt does not receive the minimum number of responses, then the IVR application 22 could demote the prompt down one or more levels or tiers. As FIG. 5 illustrates, a prompt 66 may be demoted from the first tier 50 to the second tier 54. When the cumulative number of responses to the prompt 66 is less than or equal to a first demotion threshold 68, then the Interactive Voice Response (IVR) application 22 has authority to move or demote the prompt 66 to the second tier 54.

FIG. 5 also illustrates inter-tier demotion thresholds. Each hierarchical level has an associated demotion threshold. The first tier 50, for example, has the first demotion threshold 68, while the second tier 54 has a corresponding second demotion threshold 70. Whenever a prompt's popularity can no longer satisfy a demotion threshold, then that prompt is demoted down one or more tiers. Again, those prompts with the least percentage of responses occupy the lowest tier (e.g., the third tier 58).

The same tier need not have equal promotion and demotion thresholds. At first glace the reader might think a tier's promotion and demotion thresholds would be the same value. If a certain threshold is required for promotion into a tier, then any percentage below that same threshold would qualify for demotion. Yet an administrator may configure a tier to have different promotion and demotion thresholds. Even though a prompt may qualify for promotion into a tier, the administrator may want a different percentage qualification for demotion. These unequal promotion/demotion thresholds could be especially useful when a tier can only accommodate a fixed number of prompts. That is, before a prompt can be promoted into a tier, some other prompt in that same tier must be demoted. The demotion threshold would determine the qualifications for demoting one prompt and substituting another prompt.

Figure 6:
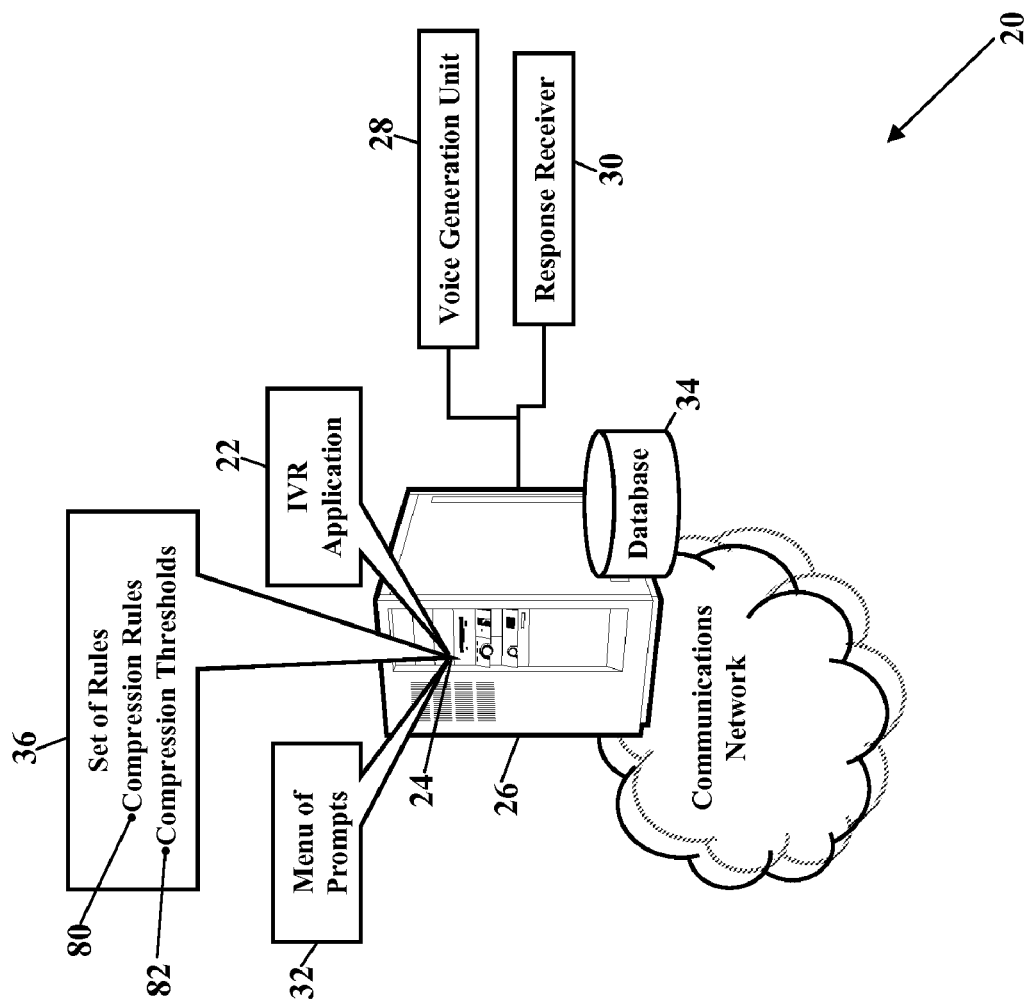
FIGS. 6 and 7 are schematics illustrating compression rules, according to more exemplary embodiments.
Figure 7:
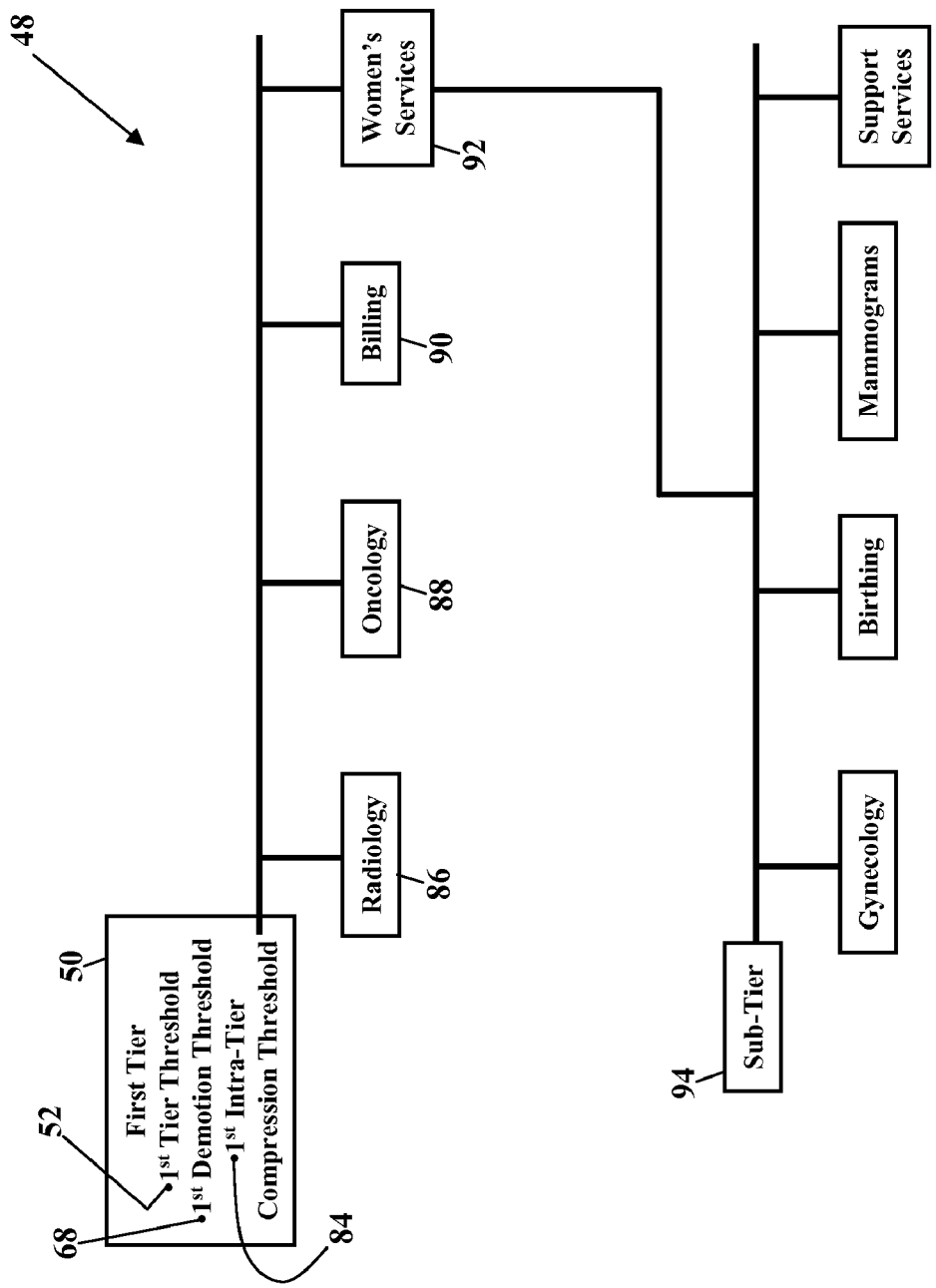

FIGS. 6 and 7 are schematics illustrating compression rules, according to more exemplary embodiments. Here the set 36 of rules includes one or more compression rules 80. The compression rules 80 describe the qualifications or requirements for generically grouping less popular prompts within a hierarchical level. The compression rules 80 describe how one or more prompts are grouped together as a common category or under a common prompt. The compression rules 80 may include one or more compression thresholds 82. The compression thresholds 82 represent a minimum number of selections or responses that are required to occupy a position within a tier. If a prompt qualifies for a tier, but the prompt cannot qualify for an explicit message, then that prompt is generically grouped with other prompts. Suppose a message states "Select 1 for the Radiology Department, select 2 for the Oncology Department, select 3 for the Billing Department, and select 4 for all other areas." Any prompt not related to radiology, oncology, or billing is categorically grouped under "Other."

FIG. 7 illustrates an intra-tier compression threshold 84. Suppose the first tier 50 is limited to four (4) prompts. Using the medical example from above, a first prompt 86 is "Radiology," a second prompt 88 is "Oncology," a third prompt 90 is "Billing," and a fourth prompt 92 is "Women's Services." Because the first tier 50 includes the generic prompt "Women's Services" 92, the first tier 50 has a sub-tier 94. The sub-tier 94 contains those prompts grouped under the generic prompt "Women's Services" 92. The first tier's compression threshold 84, then, determines what prompts get compressed into the generic prompt "Women's Services" 92. Remember the first tier 50 is limited to four (4) prompts. If an administrator chooses the first tier threshold 52 such that more than four prompts qualify for admission into the first tier 50, then the IVR application 22 must create the sub-tier 94 to accommodate all the qualifying first tier prompts. The IVR application 22 then uses the first intra-tier compression threshold 84 to determine what qualifying prompts are compressed under a generic grouping (e.g., the generic prompt "Women's Services" 92). The administrator may, instead, redefine the first tier threshold 52 and/or the first demotion threshold 68 to reduce the number of qualifying first-tier prompts.

Figure 8:
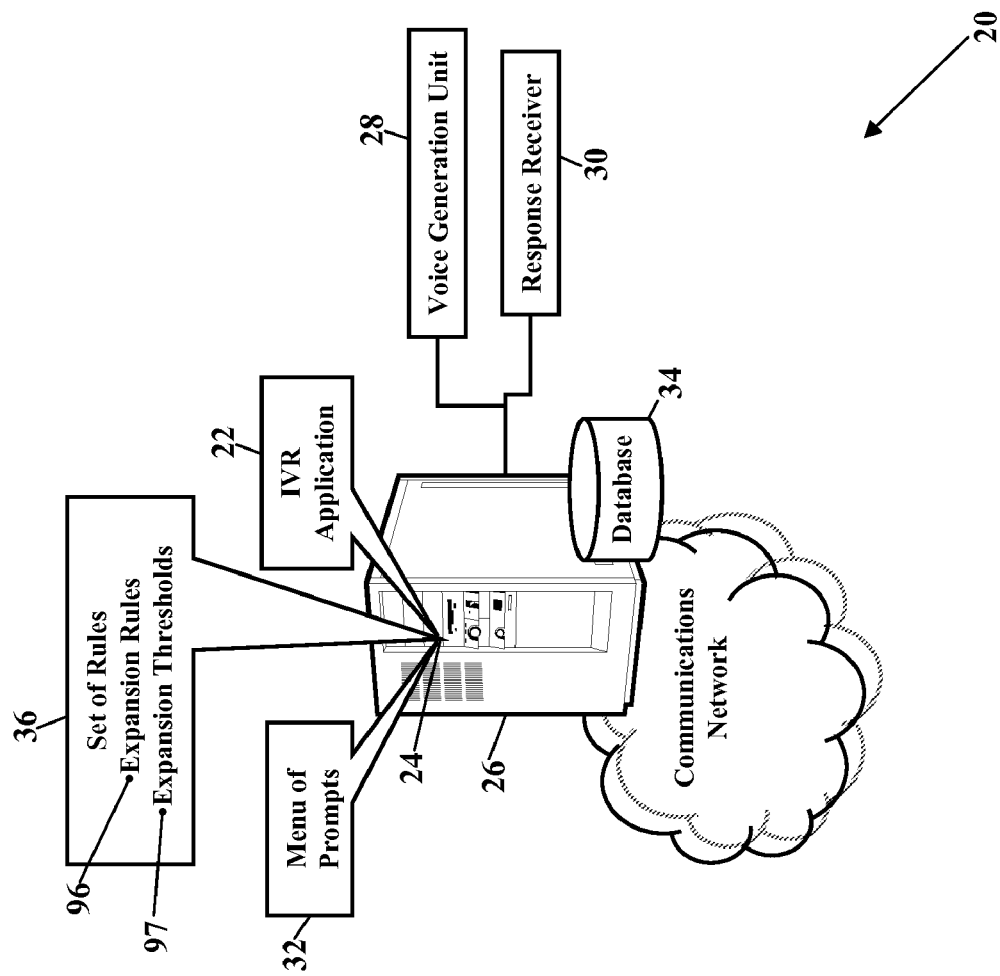
FIGS. 8 and 9 are schematics illustrating intra-tier expansion rules, according to even more exemplary embodiments.
Figure 9:
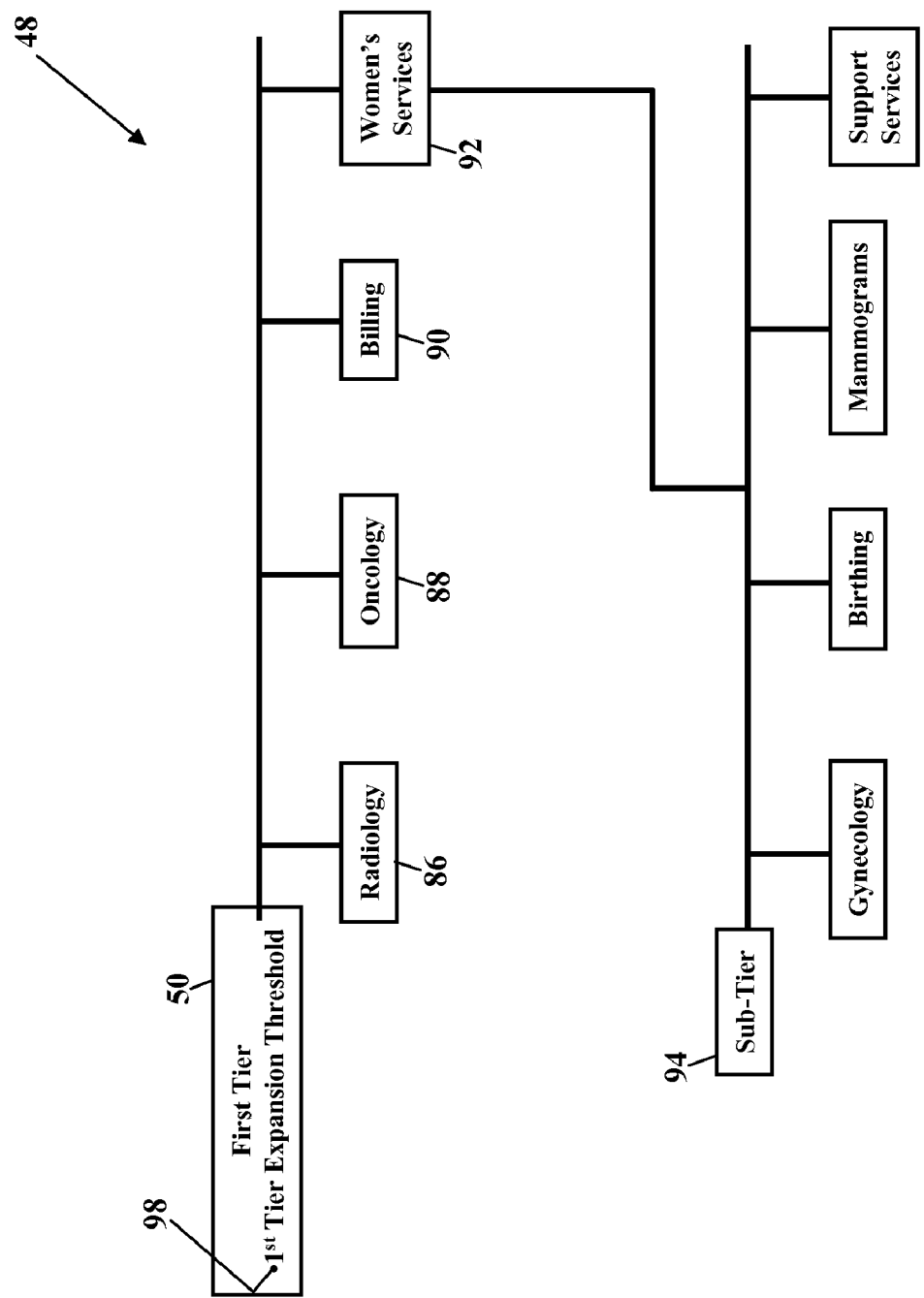

FIGS. 8 and 9 are schematics illustrating intra-tier expansion rules, according to even more exemplary embodiments. Here the set 36 of rules includes one or more expansion rules 96. The expansion rules 96 describe the qualifications or requirements for removing a prompt from a grouping of prompts. The expansion rules 96 may include one or more expansion thresholds 97. Continuing to use the medical example, the sub-tier 94 contains those prompts grouped under the generic prompt "Women's Services" 92. The first tier 50 has an associated expansion threshold 98. The expansion threshold 98 determines the percentage of responses needed to remove a prompt from under a generic grouping (e.g., the generic prompt "Women's Services" 92). If a tier is constrained to a fixed number of prompts, then the expansion threshold 98 would determine the qualifications for intra-swapping positions within the tier. Again, because the first tier 50 has been confined to four (4) prompts, and because more than four prompts qualify for admission into the first tier 50, the Interactive Voice Response (IVR) application 22 must create the sub-tier 94 to accommodate all the qualifying first tier prompts. The Interactive Voice Response (IVR) application 22 uses the first tier's expansion threshold 98 to determine what prompt qualifies for an explicit message.

Figure 10:
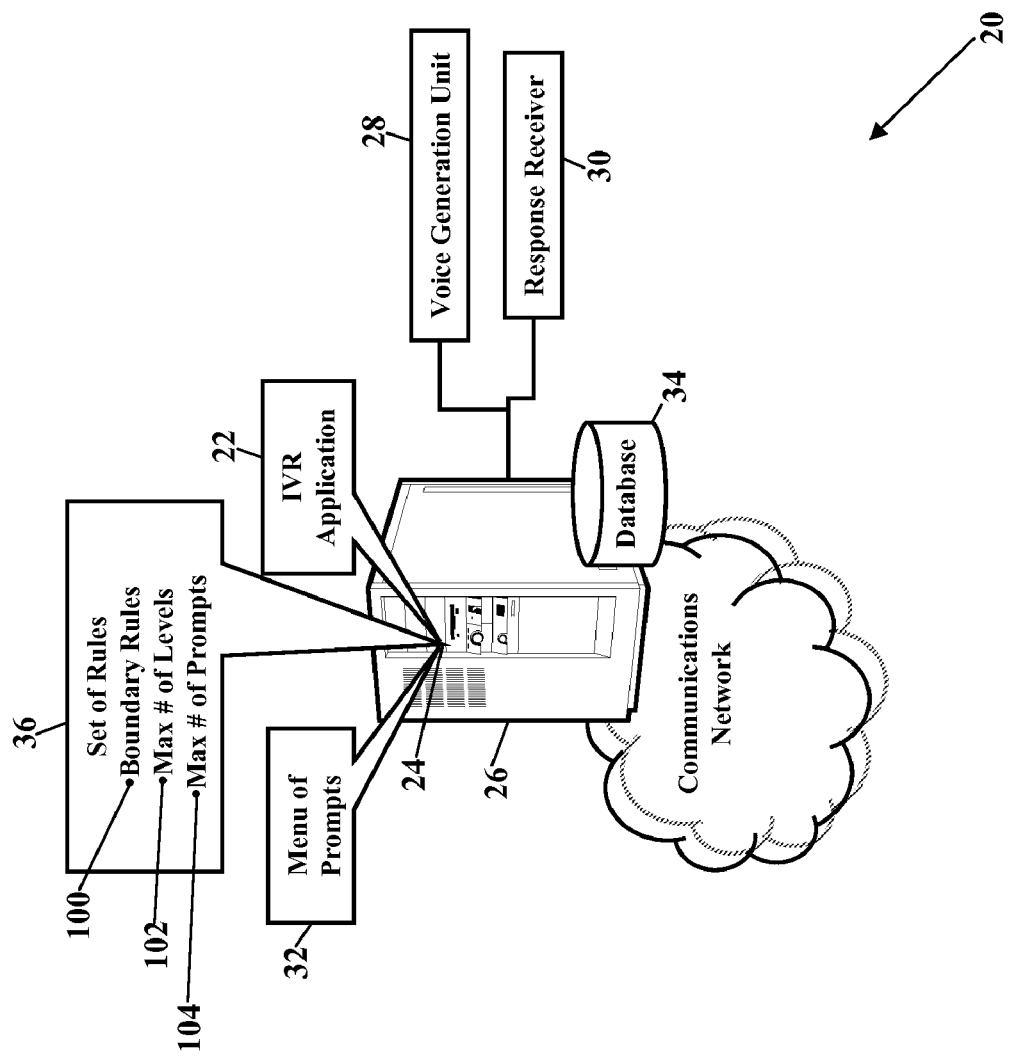
FIGS. 10 and 11 are schematics illustrating boundary rules, according to still more exemplary embodiments.
Figure 11:
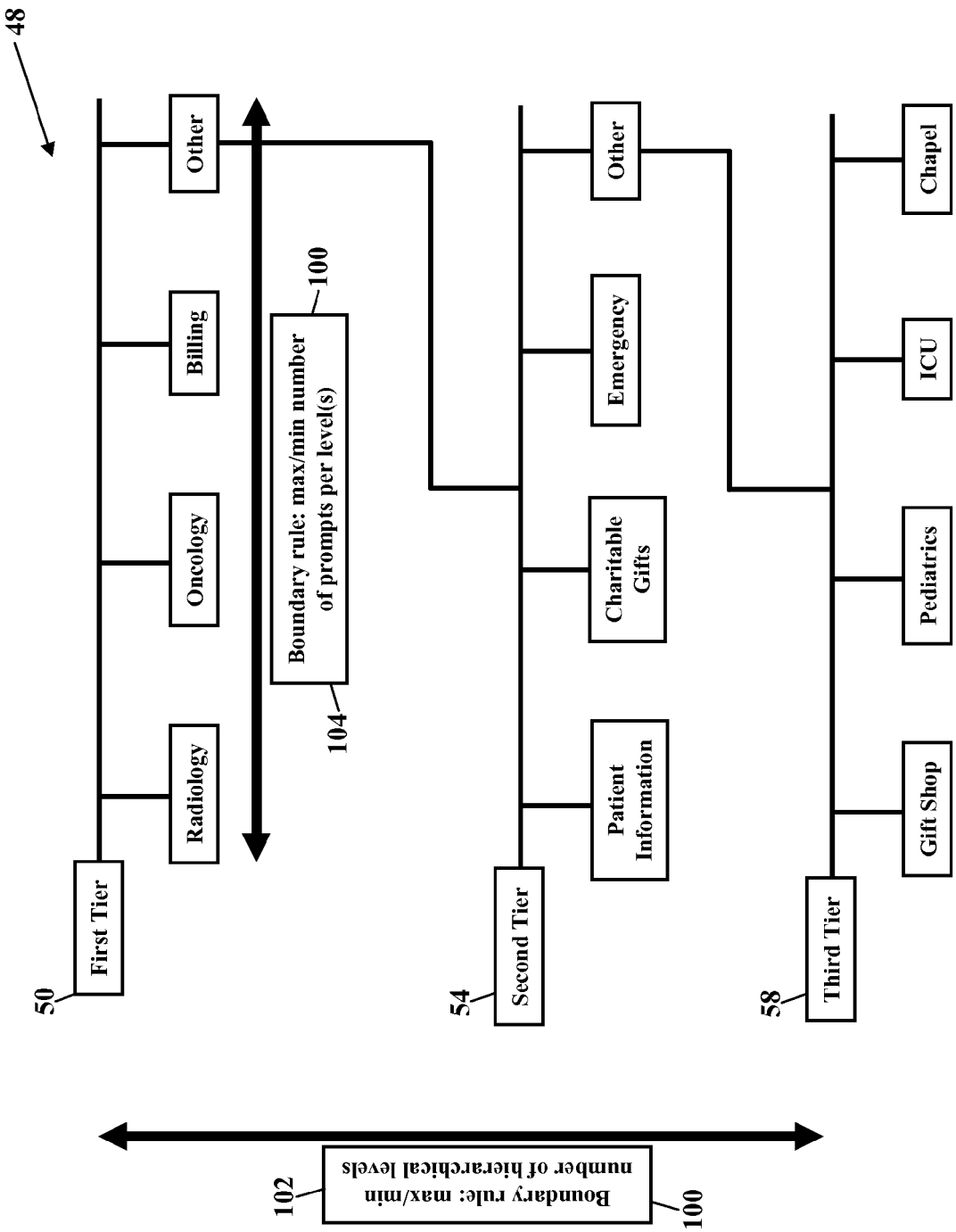

FIGS. 10 and 11 are schematics illustrating boundary rules, according to still more exemplary embodiments. Here the set 36 of rules includes one or more boundary rules 100. The boundary rules 100 enforce boundaries for the menu 32 of prompts. As the IVR application 22 monitors and analyzes the cumulative responses, the boundary rules 100 confine the hierarchical tree structure 48. The boundary rules 100, for example, may specify a maximum number 102 of hierarchical levels within the menu 32 of prompts. The boundary rules 100 may also specify a maximum number 104 of prompts within any hierarchical level or tier. The boundary rules 100, additionally, may specify a minimum number of hierarchical levels and a minimum number of prompts within any hierarchical level or tier. Suppose the boundary rules confine the hierarchical tree structure 48 to three (3) tiers (e.g., the first tier 50, the second tier 54, and the third tier 58). That is, the IVR application 22 can only reconfigure the hierarchical tree structure 48 as three (or less) tiers. Four or more levels would violate the boundary rules 100. Similarly, the boundary rules 100 may confine the number of prompts within any tier. When the number of prompts within a tier reaches the maximum permitted, the IVR application 22 may create a sub-tier within a tier. The IVR application 22 may additionally or alternately reconfigure the hierarchical tree structure 48 so that a sub-tier is not required.

The set 36 of rules may also include time and/or usage rules. A prompt may be inserted, or deleted, based on time and/or usage. A prompt, for example, may be relevant and, thus, remain on a particular tier until a specific removal date. A prompt may also remain on a tier until its usage or number of responses falls below a threshold. Suppose a prompt says "Those needing re-ticketing due to Hurricane Katrina, press 1." As this prompt's usage diminishes on the tier, the prompt may move down the menu of prompts. This same prompt, however, may not get demoted, based on other rules, until a date of expiration (such as after ten days).

Figure 12:
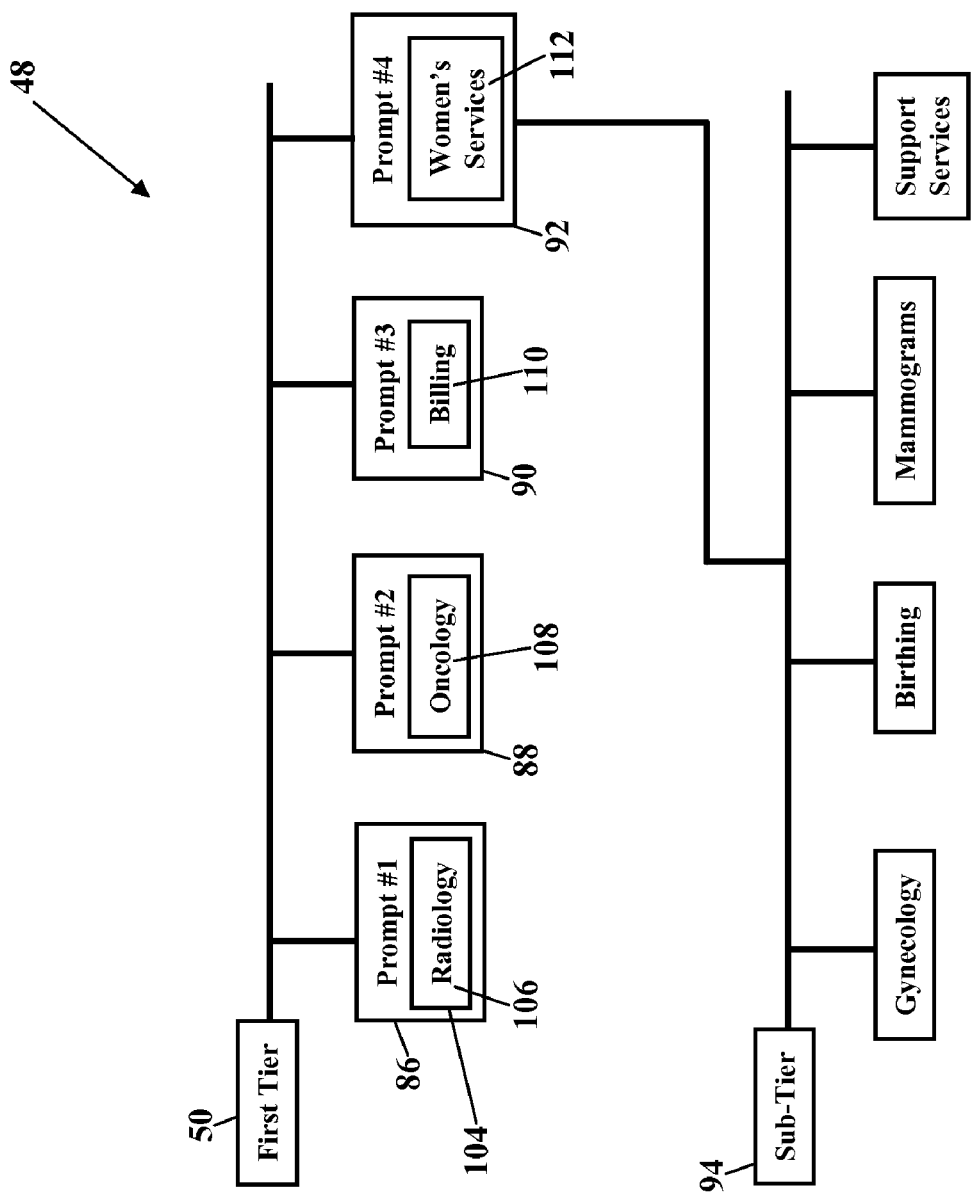
FIGS. 12-14 are schematics illustrating vocal tags, according to exemplary embodiments.
Figure 13:
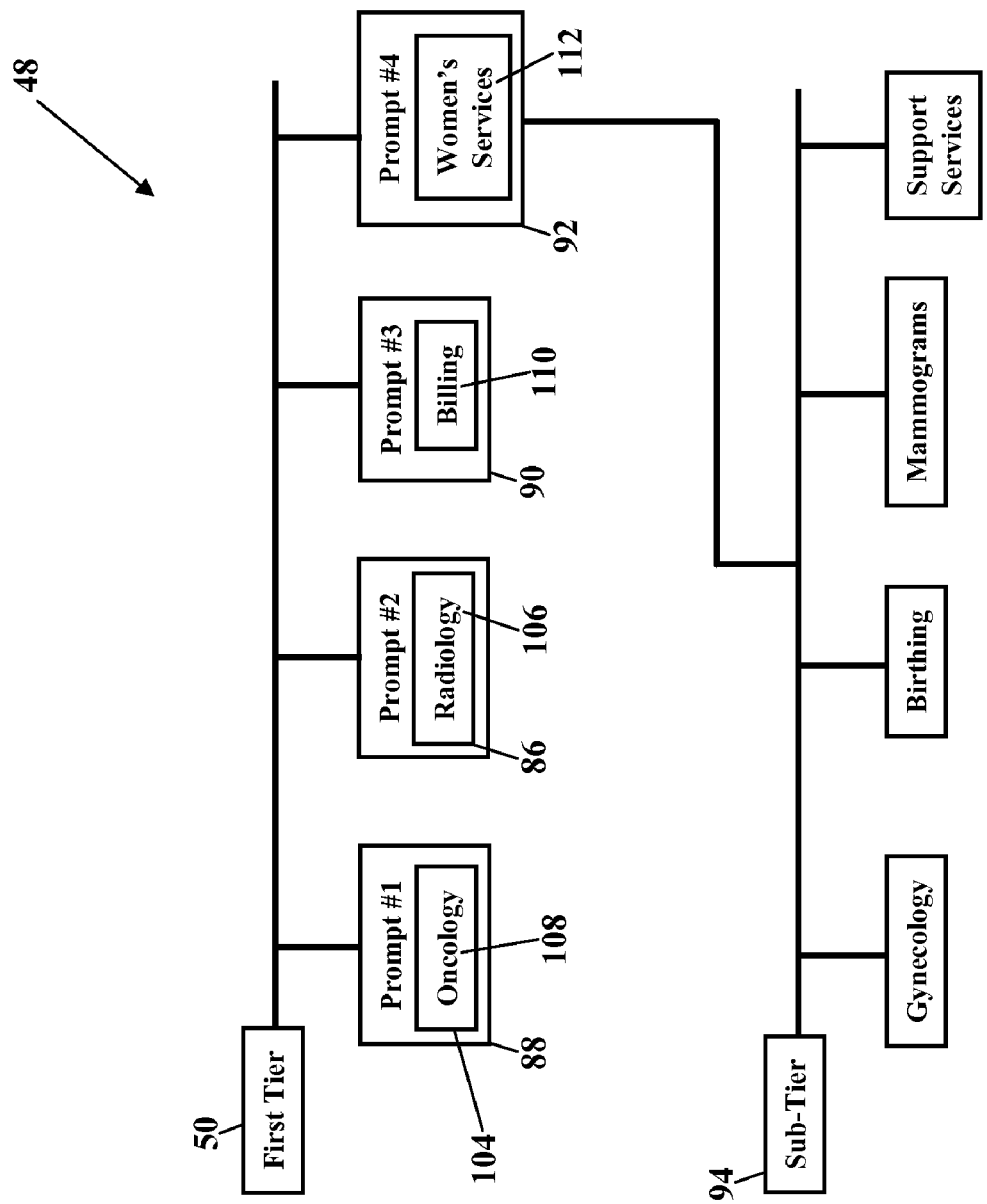
Figure 14:
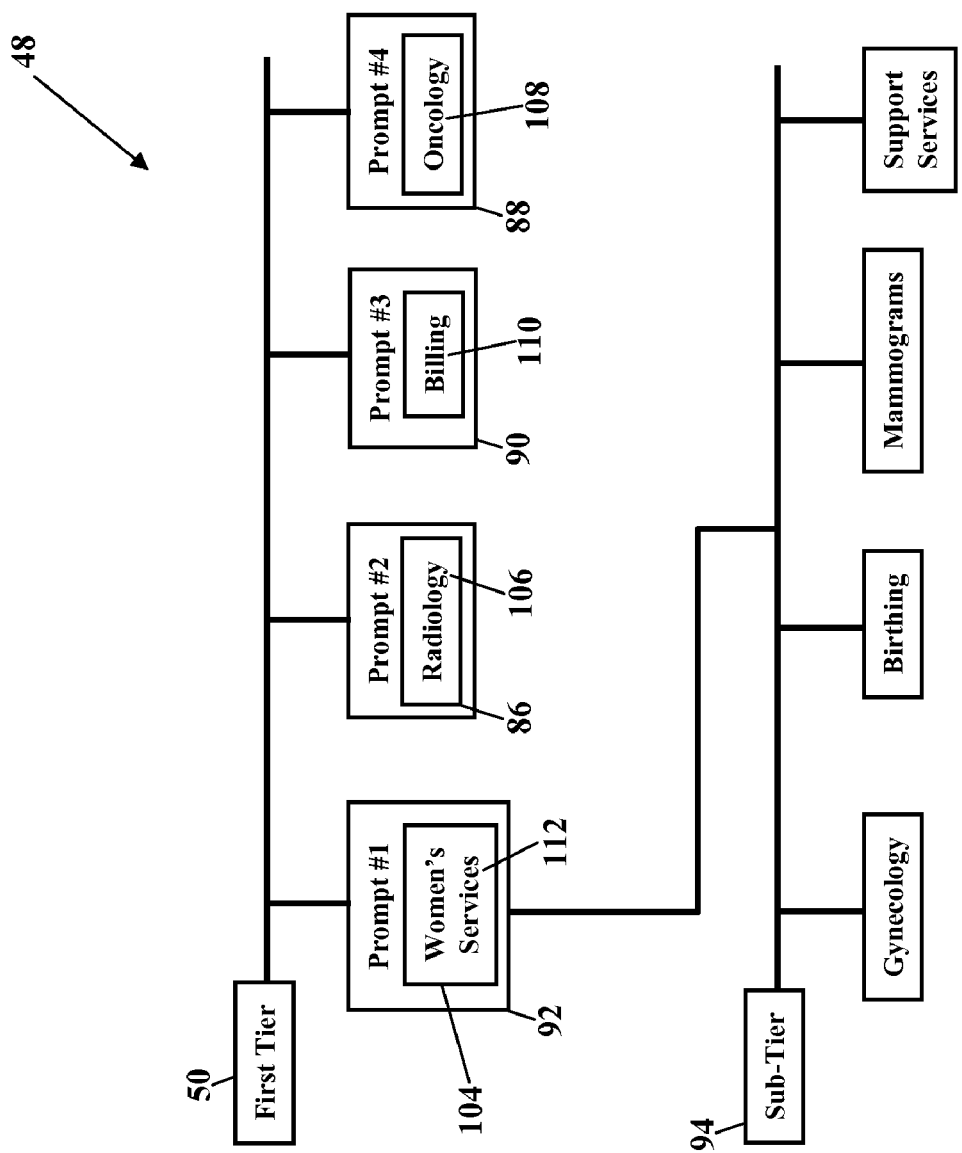

FIGS. 12-14 are schematics illustrating vocal tags, according to exemplary embodiments. Each prompt may be assigned a vocal tag 104. Each prompt's vocal tag 104 describes a genre, a category, and/or a subcategory associated with the prompt. Again using the medical example from above, each prompt 86, 88, 90, and 92 has an associated vocal tag 106, 108, 110, and 112. The vocal tag 106 "Radiology" corresponds to the first prompt 86. The vocal tag 108 "Oncology" corresponds to the second prompt 88. The vocal tag 110 "Billing" corresponds to the third prompt 90, and the vocal tag 112 "Women's Services" corresponds to the fourth prompt 92. As the Interactive Voice Response (IVR) application (shown as reference numeral 22 in FIGS. 1-11) dynamically changes the hierarchical tree structure 48, based on the aggregate responses, each prompt's vocal tag 104 follows the prompt. When the IVR application audibly presents the reconfigured hierarchical tree structure 48, the IVR application concatenates the vocal tags 104 within a level or tier. Each vocal tag 104, then, identifies its associated prompt, regardless of the prompt's position within the tier.

An example helps explain vocal tags. As FIG. 12 illustrates, the first tier 50 comprises the prompts 86, 88, 90, and 92. The corresponding vocal tags are "Radiology," "Oncology," "Billing," and "Women's Services." These prompts are popular and, thus, occupy the first tier 50. Yet suppose these same prompts vary in their respective popularity, such that the Interactive Voice Response (IVR) application dynamically changes their spoken order within the first tier 50. Because each prompt's vocal tag follows the prompt, no matter how the first tier 50 is rearranged, the IVR application can logically and clearly recite their new order. Should the IVR application rearrange the first-tier prompts to the order of 88, 86, 90, and 92, FIG. 13 illustrates how the IVR application 22 similarly rearranges the corresponding vocal tags 108, 106, 110, and 112. The IVR application 22 then concatenates the vocal tags as "Oncology," "Radiology," "Billing," and "Women's Services," thus maintaining the first tier's correct spoken order. Should the IVR application 22 again rearrange the first-tier prompts to the order of 92, 86, 90, and 88, FIG. 14 illustrates how the IVR application 22 similarly rearranges the corresponding vocal tags 112, 106, 110, and 108. The IVR application 22 then concatenates the vocal tags as "Women's Services," "Radiology," "Billing," and "Oncology," thus again maintaining the first tier's correct spoken order.

The vocal tags 104 resemble labels. As a prompt is dynamically moved throughout the hierarchical tree structure 48, the prompt's associated vocal tag follows. No matter where the Interactive Voice Response (IVR) application rearranges a prompt, the vocal tag ensures the prompt's current position is correctly recited by the IVR system. Once a tier is rearranged, the vocal tags are concatenated, thus audibly presenting the prompts in their correct order. Should a prompt be compressed under a generic category (such as the generic prompt "Women's Services" 92), the IVR system, of course, concatenates the vocal tag associated with the generic category.

The menu 32 of prompts may also be dynamically changed using a Work Force Management system. The IVR system 20 may dynamically change the menu 32 of prompts based on a Work Force Management system. The IVR system 20 may receive an input or data from a Work Force Management system. When the IVR system 20 receives this data, the IVR system 20 may compress or expand the menu of prompts. The menu of prompts, for example, may be expanded or compressed to reflect staffing in a grouping. Suppose, for example, the Work Force Management system sends correlation data corresponding to any menu tag. The menu tag may be compressed or expanded to reflect the staffing group that is covering for them. Because of this input from the Work Force Management system, telephone numbers need not be forwarded between work groups. One work group, instead, may be attached to another work group, and the menu of prompts will cover the routing based on a parent tag.

Figure 15:
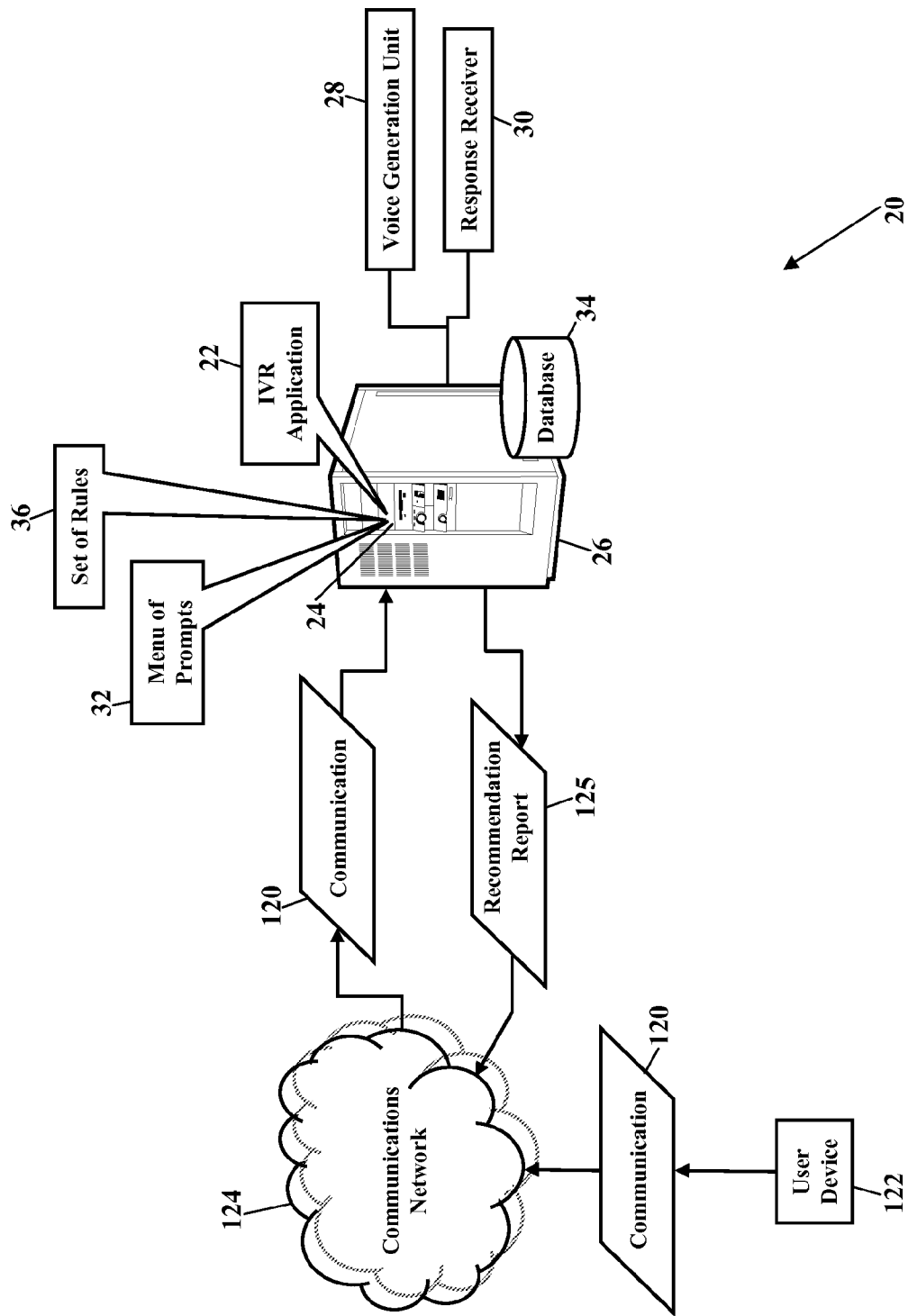
FIGS. 15 and 16 are schematics illustrating a communication to an IVR system, according to exemplary embodiments.
Figure 16:
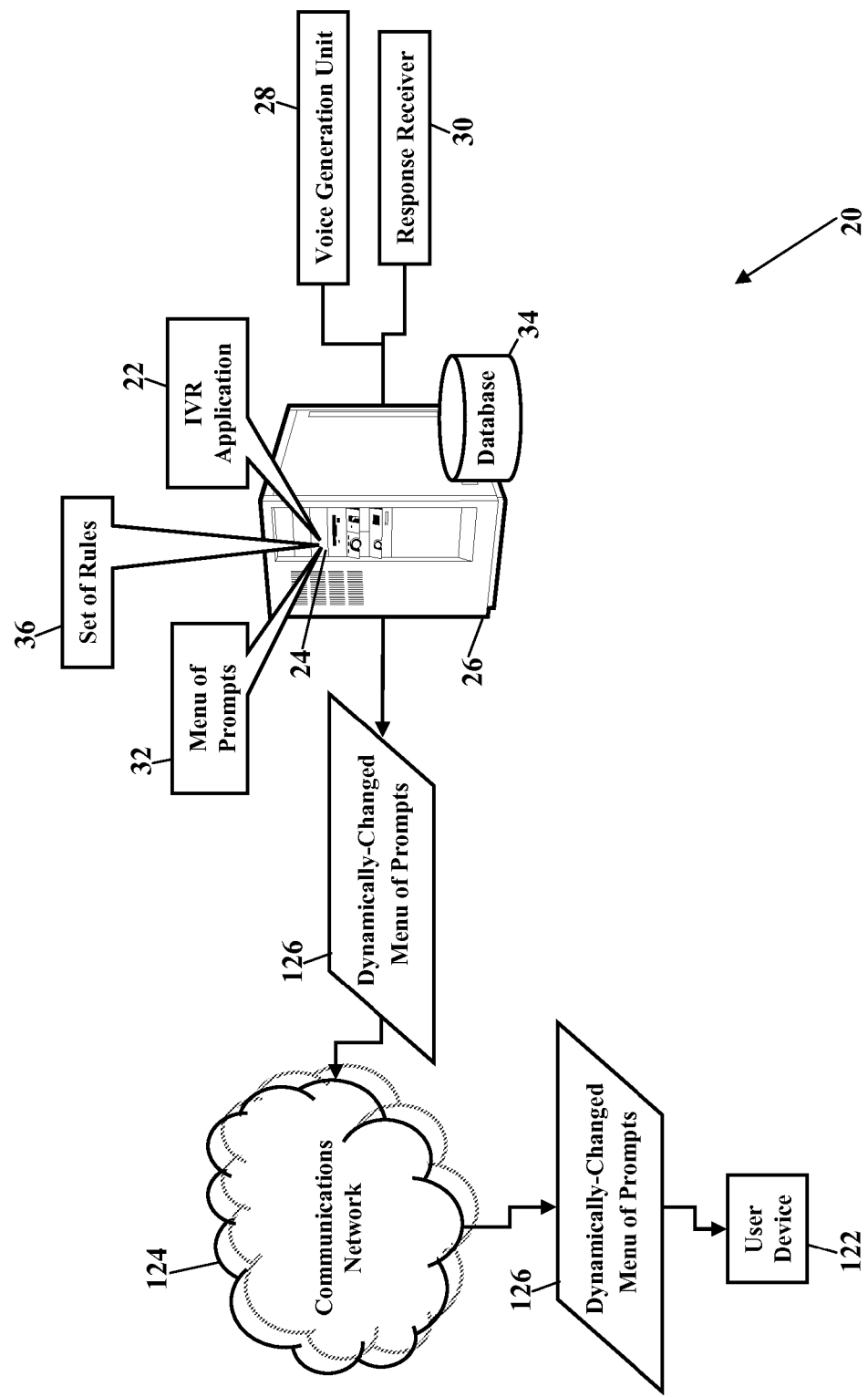

FIGS. 15 and 16 are schematics illustrating a communication to the IVR system 20, according to exemplary embodiments. The IVR system 20 monitors and analyzes the responses stored in the database 34. The IVR system 20 monitors and analyzes those responses to dynamically change the menu 32 of prompts. The menu 32 of prompts is dynamically changed to reflect the frequency or popularity of prompts. The IVR system 20 dynamically changes the menu 32 of prompts according to the set 36 of rules. The set 36 of rules imposes restrictions on the configuration of the tree structure. Once the IVR system 20 completes the dynamic transformation, the IVR system 20 updates a presentation order of the menu 32 of prompts. That updated presentation is then presented to future callers.

FIGS. 15 and 16 illustrate such a presentation. FIG. 15 illustrates that a communication 120 is received from a user device 122. The communication 120 is received via a communications network 124. The communication 120 may be a telephone call, a Voice-over IP call, or any electronic message. FIG. 16 illustrates that, whatever the communication 120, the IVR system 20 return communicates a dynamically-changed menu 126 of prompts. The dynamically-changed menu 126 of prompts represents the updated presentation order of the menu 32 of prompts. The dynamically-changed menu 126 of prompts may be audibly presented to a caller, or the dynamically-changed menu 126 of prompts may be electronically communicated to the user's device 122 via the communications network 120. The IVR system 20 audibly or visually prompts the user according to the updated presentation order.

FIG. 15 also illustrates a recommendation report 125, according to exemplary embodiments. This recommendation report 125 provides a preview of any dynamic changes to the menu 32 of prompts. That is, before the IVR application 22 implements any dynamic changes, the IVR application 22 may first send the recommendation report 125 to a manager or administrator. The recommendation report 125 describes the dynamic changes as prescribed by the set 36 of rules. The recommendation report 125 thus optionally permits a human manager or administrator to approve or deny the dynamically-changed menu 26 of prompts. The IVR application 22, then, may dynamically change the menu 26 of prompts in an automatic, autonomous fashion or in a more limited, approval fashion.

The exemplary embodiments may be applied regardless of networking environment. The communications network 120 may be a cable network operating in the radio-frequency domain and/or the Internet Protocol (IP) domain. The communications network 120 may have POTS components and/or features. The communications network 120, however, may also include a distributed computing network, such as the Internet (sometimes alternatively known as the "World Wide Web"), an intranet, a local-area network (LAN), and/or a wide-area network (WAN). The communications network 120 may include coaxial cables, copper wires, fiber optic lines, and/or hybrid-coaxial lines. The communications network 120 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 17:
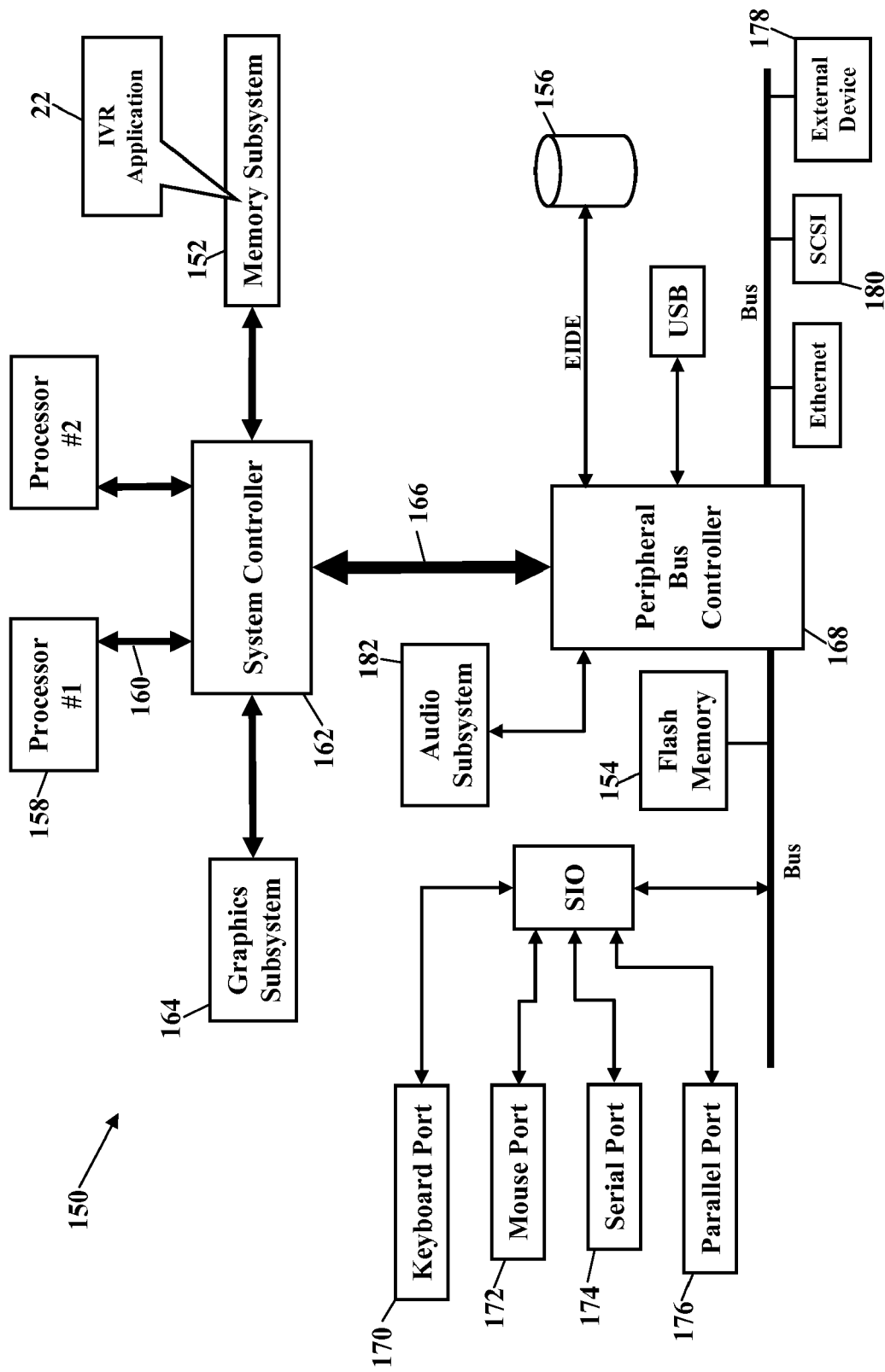
FIG. 17 depicts a possible operating environment for exemplary embodiments.

FIG. 17 depicts a possible operating environment for exemplary embodiments. FIG. 17 is a block diagram showing the IVR application 22 residing in a processor-controlled system 150 (such as the computer 26 shown in FIGS. 1-16). FIG. 17, however, may also represent a block diagram of any computer or communications device in which the IVR application 22 may operate. The IVR application 22 operates within a system memory device. The IVR application 22, for example, is shown residing in a memory subsystem 152. The IVR application 22, however, could also reside in flash memory 154 or peripheral storage device 156. The computer system 150 also has one or more central processors 158 executing an operating system. The operating system, as is well known, has a set of instructions that control the internal functions of the computer system 150. A system bus 160 communicates signals, such as data signals, control signals, and address signals, between the central processor 158 and a system controller 162. The system controller 162 provides a bridging function between the one or more central processors 158, a graphics subsystem 164, the memory subsystem 152, and a PCI (Peripheral Controller Interface) bus 166. The PCI bus 166 is controlled by a Peripheral Bus Controller 168. The Peripheral Bus Controller 168 is an integrated circuit that serves as an input/output hub for various peripheral ports. These peripheral ports could include, for example, a keyboard port 170, a mouse port 172, a serial port 174, and/or a parallel port 176 for a video display unit, one or more external device ports 178, and external hard drive ports 180 (such as IDE, ATA, SATA, or SCSI). The Peripheral Bus Controller 168 could also include an audio subsystem 182. Those of ordinary skill in the art understand that the program, processes, methods, and systems described herein are not limited to any particular computer system or computer hardware.

One example of the central processor 158 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS@ (WINDOWS@ is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 152, flash memory 154, or peripheral storage device 156) may also contain an application program. The application program cooperates with the operating system and with a video display unit (via the serial port 174 and/or the parallel port 176) to provide a Graphical User Interface (GUI). The Graphical User Interface typically includes a combination of signals communicated along the keyboard port 170 and the mouse port 172. The Graphical User Interface provides a convenient visual and/or audible interface with a subscriber of the computer system 150.

Figure 18:
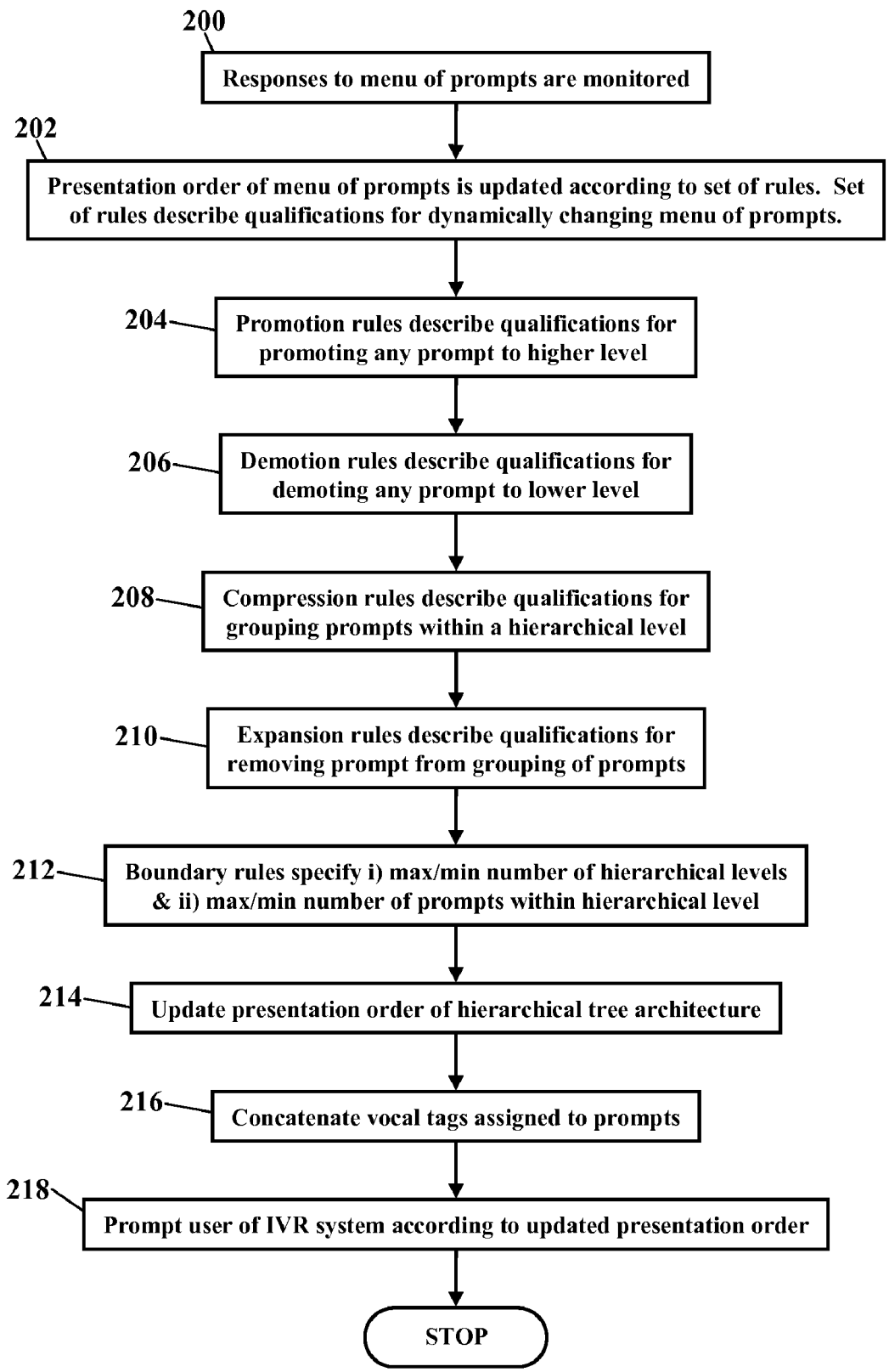
FIG. 18 is a flowchart illustrating a method for dynamically changing an Interactive Voice Response (IVR) system.

FIG. 18 is a flowchart illustrating a method for dynamically changing an Interactive Voice Response (IVR) system. Responses to a menu of prompts are monitored (Block 200). A presentation order of the menu of prompts is updated according to a set of rules (Block 202). The set of rules describe qualifications for dynamically changing the menu of prompts. According to exemplary embodiments, the set of rules may cause promotion of a prompt up a hierarchical level according to a promotion rule (Block 204). The promotion rule describes qualifications for promoting any prompt to a higher level within the menu of prompts. The set of rules may cause demotion of a prompt down a hierarchical level according to a demotion rule (Block 206). The demotion rule describes qualifications for demoting any prompt to a lower level within the menu of prompts. The set of rules may cause compression of a prompt within a hierarchical level according to a compression rule (Block 208). The compression rule describes qualifications for grouping prompts within the hierarchical level. The set of rules may cause expansion of a prompt within a hierarchical level according to an expansion rule (Block 210). The expansion rule describes qualifications for removing the prompt from a grouping of prompts. The set of rules may cause enforcement of boundaries for the menu of prompts according to boundary rules (Block 212). The boundary rules specify i) a maximum number of hierarchical levels within the menu of prompts, and ii) a maximum number of prompts within a hierarchical level. The hierarchical tree architecture of the menu of prompts is updated according to the rules and according to the responses (Block 214). Vocal tags assigned to the prompts may be concatenated (Block 216), such that when the presentation order of the menu of prompts is dynamically changed, the vocal tag is audibly presented to identify the prompt. The vocal tag describes at least one of a genre, a category, and a subcategory associated with the prompt. A user of the IVR system is then prompted according to the updated presentation order (Block 218).

The IVR application (shown as reference numeral 22 in the FIGS.) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-subscribers, licensees, and assignees. These types of computer-readable media, and other types not mention here but considered within the scope of the exemplary embodiments, allow the web browser to be easily disseminated. A computer program product comprises the IVR application stored on the computer-readable medium. The IVR application comprises computer-readable instructions/code for dynamically changing an Interactive Voice Response (IVR) system.

The IVR application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method for dynamically changing an interactive voice response system, comprising:
monitoring cumulative responses from callers to a hierarchical menu of prompts in the interactive voice response system;
retrieving thresholds associated with tiers in the hierarchical menu of prompts, each threshold representing a minimum number of responses to a prompt that is required for occupying one of the tiers within the hierarchical menu of prompts;
promoting the prompt from a lower tier to a higher tier within the hierarchical menu of prompts when a cumulative number of responses to the prompt at least equals a threshold associated with the higher tier; and
dynamically rearranging the hierarchical menu of prompts.

2. The method according to claim 1, further comprising demoting the prompt from the higher tier to the lower tier within the hierarchical menu of prompts when the cumulative number of responses to the prompt is less than the threshold associated with the higher tier.

3. The method according to claim 1, further comprising demoting the prompt from the higher tier to the lower tier within the hierarchical menu of prompts when the cumulative number of responses to the prompt is less than the minimum number of responses that are required to occupy the higher tier.

4. The method according to claim 1, further comprising retrieving a rule describing how many prompts may be grouped within the one tier.

5. The method according to claim 1, further comprising retrieving a rule describing how many prompts may be grouped within a hierarchical level of the menu of prompts.

6. The method according to claim 1, further comprising retrieving a compression threshold representing the minimum number of responses that is required to occupy a position within the one tier.

7. The method according to claim 1, further comprising compressing prompts into a sub-tier within the hierarchical level of the menu of prompts.

8. The method according to claim 1, further comprising retrieving an intra-tier compression threshold that determines which prompts are compressed under a generic grouping within the menu of prompts.

9. A system, comprising:
a processor; and
memory
for storing code that when executed causes the processor to perform operations, the operations comprising:
monitoring cumulative responses from callers to a hierarchical menu of prompts in an interactive voice response system;
retrieving thresholds associated with tiers in the hierarchical menu of prompts, each threshold representing a minimum number of responses to a prompt that is required for occupying one of the tiers within the hierarchical menu of prompts;
promoting the prompt from a lower tier to a higher tier within the hierarchical menu of prompts when a cumulative number of responses to the prompt at least equals a threshold associated with the higher tier; and
dynamically rearranging the hierarchical menu of prompts.

10. The system according to claim 9, wherein the operations further comprise demoting the prompt from the higher tier to the lower tier within the hierarchical menu of prompts when the cumulative number of responses to the prompt is less than the threshold associated with the higher tier.

11. The system according to claim 9, wherein the operations further comprise demoting the prompt from the higher tier to the lower tier within the hierarchical menu of prompts when the cumulative number of responses to the prompt is less than a minimum number of responses that are required to occupy the higher tier.

12. The system according to claim 9, wherein the operations further comprise retrieving a rule describing how many prompts may be grouped within the one tier.

13. The system according to claim 9, wherein the operations further comprise retrieving a rule describing how many prompts may be grouped within a hierarchical level of the menu of prompts.

14. The system according to claim 9, wherein the operations further comprise retrieving a compression threshold representing the minimum number of responses that is required to occupy a position within the one tier.

15. The system according to claim 9, wherein the operations further comprise compressing prompts into a sub-tier within the hierarchical level of the menu of prompts.

16. The system according to claim 9, wherein the operations further comprise retrieving an intra-tier compression threshold that determines which prompts are compressed under a generic grouping within the menu of prompts.

17. A computer readable memory storing code that when executed by a processor causes the processor to perform operations, the operations comprising:
    monitoring cumulative responses from callers to a hierarchical menu of prompts in the interactive voice response system;
    retrieving thresholds associated with tiers in the hierarchical menu of prompts, each threshold representing a minimum number of responses to a prompt that is required for occupying one of the tiers within the hierarchical menu of prompts;
    promoting the prompt from a lower tier to a higher tier within the hierarchical menu of prompts when a cumulative number of responses to the prompt at least equals a threshold associated with the higher tier; and
    dynamically rearranging the hierarchical menu of prompts.

18. The computer readable memory according to claim 17, further comprising code for demoting the prompt from the higher tier to the lower tier within the hierarchical menu of prompts when the cumulative number of responses to the prompt is less than the threshold associated with the higher tier.

19. The computer readable memory according to claim 17, further comprising code for demoting the prompt from the higher tier to the lower tier within the hierarchical menu of prompts when the cumulative number of responses to the prompt is less than a minimum number of responses that are required to occupy the higher tier.

20. The computer readable memory according to claim 17, further comprising code for retrieving a rule describing how many prompts may be grouped within the one tier.

* * * * *